United States Patent
Fan

(10) Patent No.: US 11,224,815 B2
(45) Date of Patent: Jan. 18, 2022

(54) METHOD AND APPARATUS FOR OBTAINING DAMAGE VALUE OF ATTACK ITEM IN VIRTUAL ENVIRONMENT, METHOD AND APPARATUS FOR DISPLAYING DAMAGE VALUE OF ATTACK ITEM IN VIRTUAL ENVIRONMENT, AND COMPUTER DEVICE

(71) Applicant: Tencent Technology (Shenzhen) Company Limited, Shenzhen (CN)

(72) Inventor: Yourui Fan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 29 days.

(21) Appl. No.: 16/941,498

(22) Filed: Jul. 28, 2020

(65) Prior Publication Data
US 2021/0106914 A1 Apr. 15, 2021

Related U.S. Application Data

(63) Continuation of application No. PCT/CN2019/080097, filed on Mar. 28, 2019.

(30) Foreign Application Priority Data

May 9, 2018 (CN) .......................... 201810439641.5

(51) Int. Cl.
*A63F 13/40* (2014.01)
*A63F 13/58* (2014.01)
(Continued)

(52) U.S. Cl.
CPC ............ *A63F 13/58* (2014.09); *A63F 13/573* (2014.09); *A63F 13/577* (2014.09)

(58) Field of Classification Search
CPC .......... A63F 13/40; A63F 13/42; A63F 13/44; A63F 13/45; A63F 13/50; A63F 13/52;
(Continued)

(56) References Cited

U.S. PATENT DOCUMENTS

2010/0029384 A1* 2/2010 Andersen ................ G06T 19/00
463/32
2010/0066736 A1 3/2010 Nishimura et al.
(Continued)

FOREIGN PATENT DOCUMENTS

CN 104436634 A 3/2015
CN 105245837 A 1/2016
(Continued)

OTHER PUBLICATIONS

Tencent Technology, ISR, PCT/CN2019/080097, Jun. 18, 2019, 3 pgs.
(Continued)

*Primary Examiner* — Omkar A Deodhar
(74) *Attorney, Agent, or Firm* — Morgan, Lewis & Bockius LLP

(57) ABSTRACT

This application discloses a method for obtaining a damage value of an attack item in a virtual environment performed at a computer device, and this application belongs to the computer field. The method includes: determining that an attack item shot by a virtual object hits a target object in the virtual environment; obtaining attenuation parameters of at least two media through which the attack item passes in a flight process before hitting the target object; calculating a damage value of the attack item to the target object according to the attenuation parameters of the at least two media after the attack item passes through the at least two media; and deducting a hit point value or an endurance value of the target object according to the damage value.

20 Claims, 9 Drawing Sheets

(51) Int. Cl.
*A63F 13/573* (2014.01)
*A63F 13/577* (2014.01)

(58) Field of Classification Search
CPC .......... A63F 13/55; A63F 13/56; A63F 13/57;
A63F 13/573; A63F 13/577; A63F 13/58;
A63F 13/822; A63F 13/837; A63F
2300/64; A63F 2300/643; A63F
2300/646; A63F 2300/65
See application file for complete search history.

(56) References Cited

U.S. PATENT DOCUMENTS

| | | |
|---|---|---|
| 2011/0151955 A1 | 6/2011 | Nave |
| 2014/0295926 A1 | 10/2014 | Zhang |

FOREIGN PATENT DOCUMENTS

| | | |
|---|---|---|
| CN | 106201877 A | 12/2016 |
| CN | 106440948 A | 2/2017 |
| CN | 107261479 A | 10/2017 |
| CN | 107992252 A | 5/2018 |
| CN | 108654086 A | 10/2018 |
| JP | 2010072768 A | 4/2010 |

OTHER PUBLICATIONS

Tencent Technology, WO, PCT/CN2019/080097, Jun. 18, 2019, 5 pgs.
Tencent Technology, IPRP, PCT/CN2019/080097, Nov. 10, 2020, 6 pgs.
"In an FPS Game, How Do You Judge Whether You Have Hit the Opponent?", Apr. 25, 2016, 2 pgs. Retrieved from the Internet: https://www.zhihu.com/question/44013568.
DLZhouge, "Solve! What is the Relationship Between Bullet's Lethality and Speed?", Dec. 1, 2016, 2 pgs., Retrieved from the Internet: https://zhidao.baidu.com/question/499505246.html.

\* cited by examiner

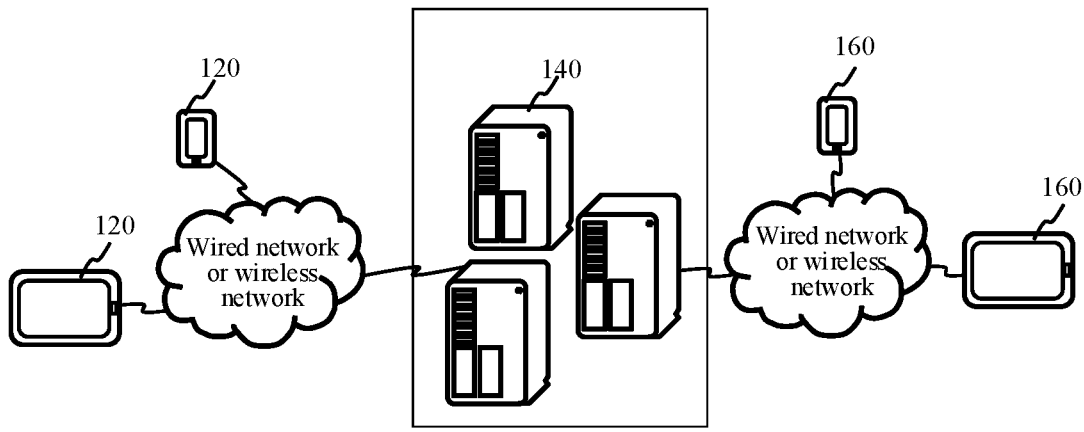

FIG. 1

Obtain, after determining that an attack item shot by a virtual object hits a target object, attenuation parameters of at least two media through which the attack item passes in a flight process before hitting the target object — 201

Calculate a damage value of the attack item to the target object according to the attenuation parameters of the at least two media after the attack item passes through the at least two media — 202

Deduct a hit point value of the target object according to the damage value — 203

FIG. 2

METHOD AND APPARATUS FOR OBTAINING DAMAGE VALUE OF ATTACK ITEM IN VIRTUAL ENVIRONMENT, METHOD AND APPARATUS FOR DISPLAYING DAMAGE VALUE OF ATTACK ITEM IN VIRTUAL ENVIRONMENT, AND COMPUTER DEVICE

CROSS REFERENCE TO RELATED APPLICATIONS

This application is a continuation application of PCT Patent Application No. PCT/CN2019/080097, entitled "ATTACKING OBJECT DAMAGE ACQUIRING METHOD AND APPARATUS IN VIRTUAL ENVIRONMENT, ATTACKING OBJECT DAMAGE DISPLAY METHOD AND APPARATUS, AND COMPUTER DEVICE" filed on Mar. 28, 2019, which claims priority to Chinese Patent Application No. 201810439641.5, entitled "METHOD AND APPARATUS FOR OBTAINING DAMAGE OF ATTACK ITEM IN VIRTUAL ENVIRONMENT, AND DEVICE" filed May 9, 2018, all of which are incorporated by reference in their entirety.

FIELD OF THE TECHNOLOGY

This application relates to the computer field, and in particular, to a method and apparatus for obtaining a damage value of an attack item in a virtual environment, a method and apparatus for displaying a damage value of an attack item in a virtual environment, and a computer device.

BACKGROUND OF THE DISCLOSURE

Terminals such as a smartphone and a tablet computer are provided with many application programs including a two-dimensional or a three-dimensional virtual environment, for example, a virtual reality application program, a three-dimensional map program, a military simulation program, a first-person shooting (FPS) game, a third-person shooting (TPS) game, and a multiplayer online battle arena (MOBA) game.

In the foregoing application programs, a user controls a virtual object to shoot by using a ranged weapon, to cause damage to a target object such as an object or another virtual object in a virtual environment.

SUMMARY

According to various embodiments of this application, a method and apparatus for obtaining a damage value of an attack item in a virtual environment, a method and apparatus for displaying a damage value of an attack item in a virtual environment, and a computer device are provided.

A method for obtaining a damage value of an attack item in a virtual environment is provided, performed by a computer device having a processor and memory storing a plurality of computer programs to be executed by the processor, the method including:

detecting a fire of an attack item by a virtual object in the virtual environment;

in response to the fire of the attack item, obtaining attenuation parameters of at least two media through which the attack item passes in a flight process;

calculating a ballistic trajectory of the attack item based, at least in part, on the attenuation parameters;

determining whether the attack item hits a target object in the virtual environment along the ballistic trajectory;

in accordance with a determination that the attack item hits the target object, calculating a damage value of the attack item to the target object according to the attenuation parameters of the at least two media after the attack item passes through the at least two media; and deducting a hit point value of the target object according to the damage value.

A computer device is provided, including a processor and a memory, the memory storing a plurality of computer-executable instructions, and the computer-executable instructions, when loaded and executed by the processor, causing the computer device to implement the foregoing method for obtaining a damage value of an attack item in a virtual environment.

A non-transitory computer-readable storage medium is provided, storing a plurality of computer-executable instructions, and the computer-executable instructions, when loaded and executed by the processor, causing the computer device to implement the foregoing method for obtaining a damage value of an attack item in a virtual environment.

Details of one or more embodiments of this application are provided in the accompany drawings and description below. Other features and advantages of this application become more obvious with reference to the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from the accompanying drawings without creative efforts.

FIG. 1 is a structural block diagram of a computer system according to an exemplary embodiment of this application.

FIG. 2 is a flowchart of a method for obtaining a damage value of an attack item according to an exemplary embodiment of this application.

DESCRIPTION OF EMBODIMENTS

Figure 3:
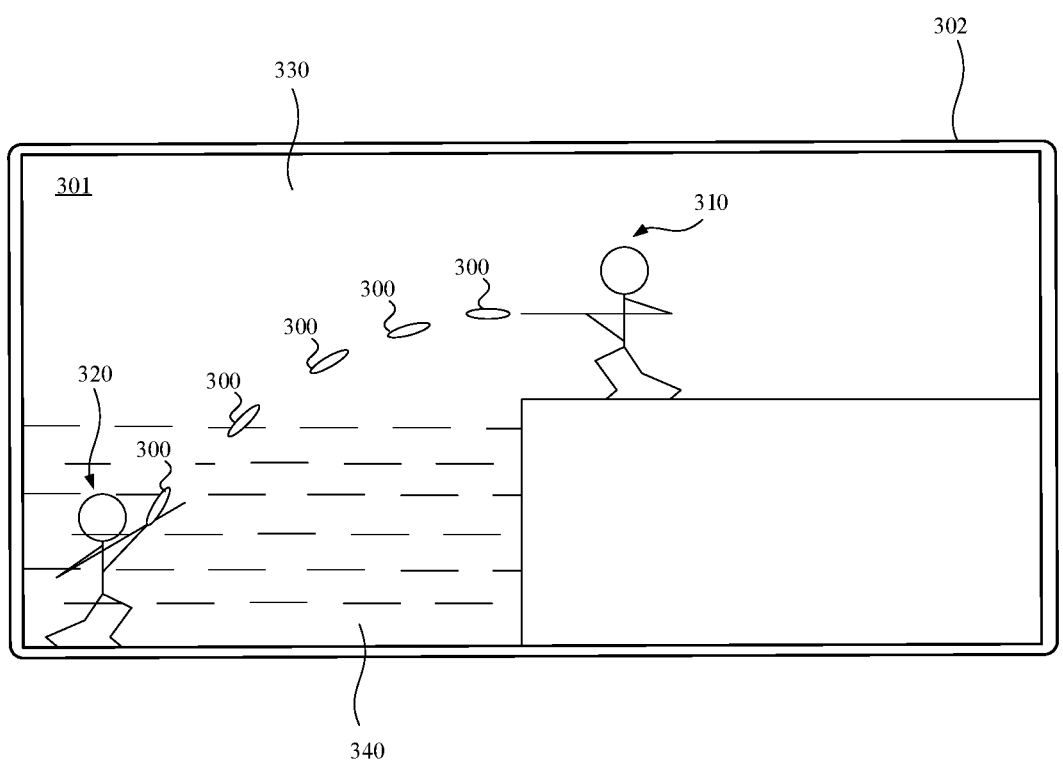
FIG. 3 is a diagram of a scene in which a virtual object in a virtual environment shoots an attack item according to an exemplary embodiment of this application.

To make the objectives, technical solutions, and advantages of this application clearer, the following further describes implementations of this application in detail with reference to the accompanying drawings. It is to be understood that the specific embodiments described herein are only used to describe this application, instead of limiting this application.

Typically, the method for obtaining a damage value of an attack item in a virtual environment can be applied to the following application scenario:

obtaining a damage value of an object in a client game:

In a case that a terminal runs an application program of a virtual environment, a user may operate a virtual object by controlling a joystick, a mouse and a keyboard, or a touch display screen, and control the virtual object to shoot with a ranged weapon, to cause damage to an object in the virtual environment. In a flight process of an attack item, the environment through which the attack item passes is quite complicated, and in the related art, influence of the environment is not considered in the calculation of a damage value of the attack item. Consequently, the damage value of the attack item obtained through calculation is not precise. As a result, a simulation effect of the virtual environment is not real in some situations. The method for obtaining a damage value of an attack item provided in the embodiments of this application is built in a terminal in the form of an application program of a virtual environment. When the terminal runs the application program, the virtual environment is displayed on a display interface of the application program, and the user controls a virtual object to shoot at a target object. By performing the method provided in the embodiments of this application, the terminal may calculate a damage value of the attack item to the target object after the attack item passes through at least two media, thereby improving trueness of the virtual environment.

Terms involved in the embodiments of this application are introduced below:

Virtual environment: a virtual environment displayed (or provided) by an application program when run on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, and a three-dimensional virtual environment. This is not limited in this application. Description is made by using an example in which the virtual environment is a three-dimensional virtual environment in the following embodiments. Optionally, the virtual environment is further used for a virtual environment battle performed between at least two virtual roles.

The virtual environment may be used for simulating a real environment in reality. For example, the virtual environment may include the sky, the land, and the ocean, and the land may include environment elements such as a desert and cities. The user may control a virtual object to move or perform a corresponding action in the virtual environment.

Using a shooting game as an example, the user may control the virtual object to fall freely, glide, or open a parachute to fall in the sky of the virtual environment; or run, jump, crawl, or stoop and move forward on the land; or may control the virtual object to swim, float, or dive in the ocean. Certainly, the user may alternatively control the virtual object to take a vehicle to move in the virtual environment. The foregoing scenes are merely used as an example for description, and this is not specifically limited in the embodiments of this application. The user may alternatively control the virtual object to fight against another virtual object by using a ranged weapon. When the attack item is an object such as a bullet, an arrow, or a pellet, the ranged weapon may be a cold weapon such as a bow, a crossbow, or a slingshot, or may be a hot weapon such as a pistol, a rifle, or a mortar; and when the attack item is a weapon that needs to be thrown by one hand such as a javelin, a grenade, or a throwing knife, the ranged weapon may be regarded as the hand of the virtual object. This is not specifically limited in this application.

Application program: a computer program for achieving one or more application objectives. The computer program can interact with a user and include a visible user interface. The application program may be run on a terminal such as a desktop computer, an Apple computer, or a notebook computer, or may be run on a mobile terminal such as a mobile smartphone or a tablet computer. The application program may be a virtual reality application program, a three-dimensional map program, a military simulation program, an FPS game, or a MOBA game. In a case that the application program is a game, the application program includes a client game run on a terminal and a mobile game run on a mobile terminal. Optionally, the method for obtaining a damage value of an attack item in a virtual environment provided in the embodiments of this application is applied to a client game.

Virtual object: a movable object in a virtual environment. The movable object may be a virtual character, a virtual animal, a cartoon character, or the like, such as a character, an animal, a plant, an oil drum, a wall, a stone, or the like displayed in a three-dimensional virtual environment. Optionally, the virtual object is a three-dimensional model created based on a skeletal animation technology. Each virtual object has a shape and a volume in the three-dimensional virtual environment, and occupies some space in the three-dimensional virtual environment.

Attack item: ammunition corresponding to a ranged weapon used by a virtual object in a virtual environment. The ranged weapon may be a hot weapon, or may be a cold weapon, or may be a hand of the virtual object. For example, the user controls the virtual object to use a gun to attack a target object, and a bullet of the gun is an attack item; for another example, the user controls the virtual object to use a grenade to attack a target object, and the grenade is also an attack item; for another example, the user controls the virtual object to use a bow to attack a target object, an arrow of the bow is an attack item; and for another example, the user controls the virtual object to throw a stone to attack a target object, the stone is an attack item, and one hand of the virtual object corresponding to the stone is a ranged weapon. The target object is a virtual object in the virtual environment, or an object in the virtual environment.

Ballistic trajectory: a flight trajectory of an attack item in a virtual environment. For example, the virtual object controlled by the user uses a gun to fire at the target object and hits the target object, and images in which a bullet flies out of a muzzle of the gun until the bullet flies onto the target object and that are displayed on a user interface are a trajectory. In this scene, a trajectory of a bullet is approximately a straight line. For another example, the virtual object controlled by the user uses a grenade to throw at a target object and hits the target object, and images in which a grenade flies out of one hand of the virtual object until the grenade hits the target object in a parabola form and that are displayed on the user interface are the trajectory.

Hit information reporting: a terminal detects whether a local attack item hits a target object, and reports hit information to a server in a case of determining that the attack item hits the target object.

Hit check: a server performs a validity check on hit information reported by a terminal. For example, the user may install a cheating program on the terminal to tamper with a hit rate of an attack item, and the server detects whether the hit information of the attack item is tampered with; if yes, the hit information is invalid; otherwise, the hit information is valid.

FIG. 1 shows a structural block diagram of a computer system according to an exemplary embodiment of this application. The computer system 100 includes a first terminal 120, a server 140, and a second terminal 160.

An application program supporting a virtual environment is installed and run on the first terminal 120. The application program may be any one of a virtual reality application program, a three-dimensional map program, a military simulation program, an FPS game, a MOBA game, and a multiplayer shooting survival game. The first terminal 120 is a terminal used by a first user, the first user uses the first terminal 120 to control a first virtual object in the virtual environment to perform a movement, and the movement includes, but is not limited to, at least one of body posture adjustment, crawling, walking, running, cycling, jumping, driving, picking-up, shooting, attacking, and throwing. For example, the first virtual object is a first virtual character, such as a simulated character role or a cartoon character role.

The first terminal 120 is connected to the server 140 by using a wireless network or a wired network.

The server 140 includes at least one of one server, a plurality of servers, a cloud computing platform, and a virtualization center. The server 140 is configured to provide background services for the application program supporting a three-dimensional virtual environment. Optionally, the server 140 takes on primary computing work, and the first terminal 120 and the second terminal 160 take on secondary computing work; alternatively, the server 140 takes on secondary computing work, and the first terminal 120 and the second terminal 160 take on primary computing work; alternatively, collaborative computing is performed by using a distributed computing architecture among the server 140, the first terminal 120, and the second terminal 160.

An application program supporting a virtual environment is installed and run on the second terminal 160. The application program may be any one of a virtual reality application program, a three-dimensional map program, a military simulation program, an FPS game, a MOBA game, and a multiplayer shooting survival game. The second terminal 160 is a terminal used by a second user, the second user uses the second terminal 160 to control a second virtual object in the virtual environment to perform a movement, and the movement includes, but is not limited to, at least one of body posture adjustment, crawling, walking, running, cycling, jumping, driving, picking-up, shooting, attacking, and throwing. For example, the second virtual object is a second virtual character, such as a simulated character role or a cartoon character role.

Optionally, the first virtual character and the second virtual character are located in the same virtual environment. Optionally, the first virtual character and the second virtual character may belong to the same team or the same organization, have a friend relationship, or have a temporary communication permission. Optionally, the first virtual character and the second virtual character may belong to different teams, different organizations, or have a hostile relationship with each other.

Optionally, the application programs installed on the first terminal 120 and the second terminal 160 are the same, or the application programs installed on the two terminals are the same type of application programs of different control system platforms. The first terminal 120 may generally refer to one of a plurality of terminals, the second terminal 160 may generally refer to one of a plurality of terminals, and in this embodiment, description is made by using only the first terminal 120 and the second terminal 160 as an example. Device types of the first terminal 120 and the second terminal 160 are the same or different. The device type includes at least one of a smartphone, a tablet computer, an ebook reader, an MP3 player, an MP4 player, a portable laptop computer, and a desktop computer. In the following embodiments, description is made by using an example in which the terminal includes a smartphone.

A person skilled in the art may learn that there may be more or fewer terminals. For example, there may be only one terminal, or there may be dozens of or hundreds of or more terminals. The quantity and the device type of the terminal are not limited in the embodiments of this application.

FIG. 2 shows a flowchart of a method for obtaining a damage value of an attack item in a virtual environment according to an exemplary embodiment of this application. The method may be applied to the server 140, the first terminal 120, or the second terminal 160 in the embodiment of FIG. 1, and the method includes:

Step 201: Obtain, after determining that an attack item shot by a virtual object hits a target object, attenuation parameters of at least two media through which the attack item passes in a flight process before hitting the target object.

When the method is performed by a server, an application program corresponding to the virtual environment is run on a terminal. After the user controls the virtual object to use a ranged weapon to shoot an attack item at the target object, the terminal transmits hit information to the server in a case of determining that the attack item hits the target object, and the server receives the hit information. The hit information carries the attenuation parameters of the at least two media through which the attack item passes in the flight process before hitting the target object.

When the method is performed by a server, an application program corresponding to the virtual environment is run on a terminal. After the user controls the virtual object to use a ranged weapon to shoot an attack item at the target object, the terminal obtains the attenuation parameters of the at least two media through which the attack item passes in the flight process before hitting the target object in a case of determining that the attack item hits the target object.

A medium is an environment in which an attack item in a virtual environment flies. For example, as shown in FIG. 3, a display interface 301 of the virtual environment is displayed on a display screen 302 of a terminal. The user operates a virtual object 310 to shoot an attack item 300 at a target object 320, and locations of the attack item 300 displayed before hitting the target object 320 form a ballistic trajectory of the attack item 300. As can be seen in the figure, the attack item 300 passes through two different environments in a flight process, namely, air 330 and water 340, so that the attack item 300 passes through two media in the flight process before hitting the target object 320, where a first medium 330 is the air, and a second medium 340 is the water. Optionally, the medium may be at least one of the air, the water, a metal plate, glass, a box, a wall, snow, and a tree in the virtual environment.

The target object is an object attacked by the user by controlling the virtual object, and the target object may be a living thing, or may be a non-living thing. For example, the first user may control a first virtual object to use a gun to shoot at a second virtual object controlled by the second user, and in this scene, the second virtual object is the target object of the first virtual object; the user may control the virtual object to use a gun to shoot at an animal in the virtual environment, such as a wolf, a lion, or a hyena, and in this scene, the animal is the target object of the virtual object; and the user may control the virtual object to attack an item in the virtual environment, such as a body armor, a shield, a helmet, or a dynamite pack, and in this scene, the item is the target object of the virtual object.

For example, the terminal or the server may calculate a ballistic trajectory of the attack item according to an initial speed $V_0$ of the attack item and a gravitational acceleration G in the virtual environment, to learn a medium through which the attack item passes in the flight process according to the medium through which the ballistic trajectory passes, to further obtain the attenuation parameters of the medium through which the attack item passes in the flight process. For example, the ballistic trajectory passes through media such as air, water, and a wall, attenuation parameters of the media through which the ballistic trajectory passes are transmitted to the terminal through the hit information, where attenuation parameters of a medium refer to parameters leading to a decrease of a speed of the attack item in a case that the attack item passes through the medium.

Optionally, the terminal or the server may calculate a flight speed of the attack item in each medium according to the initial speed $V_0$ of the attack item and the attenuation parameters of the media through which the attack item passes in the flight process, and calculate the ballistic trajectory of the attack item according to the flight speed of the attack item in each medium and the gravitational acceleration G.

Step 202: Calculate a damage value of the attack item to the target object according to the attenuation parameters of the at least two media after the attack item passes through the at least two media.

Exemplarily, the attack item passes through a first medium and a second medium successively in the flight process, and the server or the terminal calculates according to the initial speed $V_0$ of the attack item and a first attenuation parameter $a_1$ of the first medium through which the attack item passes, that a speed of the attack item is attenuated from the initial speed $V_0$ to a speed $V_1$ after the attack item passes through the first medium; calculates according to the speed $V_1$ of the attack item after passing through the first medium and a second attenuation parameter $a_2$ of the second medium through which the attack item passes, that the speed of the attack item is attenuated from the speed $V_1$ to a speed $V_2$; and calculates, in a case that the attack item hits the target object after passing through the second medium, a damage value of the attack item to the target object according to the speed $V_2$ after the attack item passes through the first medium and the second medium. The attack item may pass through a plurality of media in the virtual environment, and description is made only by using an example in which the attack item passes through two media herein.

Step 203: Deduct a hit point value of the target object according to the damage value of the attack item.

When the method is performed by a server, the server transmits a damage instruction to a terminal after the server calculates the damage value of the attack item to the target object after the attack item passes through at least two media, the damage instruction carrying the damage value; and after receiving the damage instruction, the terminal deducts a hit point value of the target object according to the damage value in a case that the target object is a living thing; or deducts an endurance value of the target object according to the damage value in a case that the target object is a non-living thing.

When the virtual object shooting the attack item is the first virtual object corresponding to the first terminal, and there is a second virtual object corresponding to at least one second terminal in the same virtual environment, the server transmits the damage instruction to the first terminal and the at least one second terminal simultaneously. After receiving the damage instruction, the first terminal and the at least one second terminal respectively deduct the hit point value or the endurance value of the target object according to the damage value carried in the damage instruction. The target object may be the second virtual object, or may be a living thing or a non-living thing in the virtual environment.

When the method is performed by a terminal, the terminal transmits the damage value to a server after the terminal calculates the damage value of the attack item to the target object after the attack item passes through at least two media. The server performs a validity check on the damage value after receiving the damage value, and transmits a damage instruction to the terminal if the damage value is valid. After receiving the damage instruction, the terminal deducts a hit point value of the target object according to the damage value in a case that the target object is a living thing; or deducts an endurance value of the target object according to the damage value in a case that the target object is a non-living thing.

When the virtual object shooting the attack item is the first virtual object corresponding to the first terminal, and there is a second virtual object corresponding to at least one second terminal in the same virtual environment, if the server determines that the damage value transmitted by the terminal is valid, the server transmits a damage instruction to the first terminal, and the first terminal deducts a hit point value or an endurance value of the target object according to the damage value after receiving the damage instruction; the server transmits a damage instruction to the at least one second terminal, the damage instruction carrying the damage value, and after receiving the damage instruction, the at least one second terminal respectively deducts the hit point value or the endurance value of the target object according to the damage value carried in the damage instruction. The target object may be the second virtual object, or may be a living thing or a non-living thing in the virtual environment.

The hit point value is a damage value that a living thing in the virtual environment can bear. For example, a maximum hit point value of a villain in the virtual environment is 1000, indicating that the villain can bear a damage value of 1000. If an attack item hits the villain and generates a damage value of 100, the hit point value of the villain is 1000−100=900. That is, the villain can still bear a damage value of 900, and the villain is dead in the virtual environment when the hit point value of the villain is 0.

The endurance value is a damage value that an item in the virtual environment can bear. For example, a maximum endurance value of a shield in the virtual environment is 500, indicating that the shield can bear a damage value of 500. If an attack item hits the shield and generates a damage value of 50, the endurance value of the shield is 500−50=450. That is, the shield can still bear a damage value of 450, and the shield cannot be used when the endurance value of the shield is 0.

Based on the above, in this embodiment of this application, the attenuation parameters of the at least two media through which the attack item passes in the flight process before hitting the target object are obtained, the damage value of the attack item to the target object after the attack item passes through the at least two media is calculated according to the attenuation parameters of the at least two media, and the hit point value or the endurance value of the target object is deducted according to the damage value. The damage value is calculated according to the attenuation parameters of the at least two media, so that a problem that in the related art, the influence of the environment is not considered in the calculation of the damage value of the attack item, leading to a relatively poor simulation effect of the virtual environment is resolved, thereby improving trueness of the virtual environment.

Figure 4:
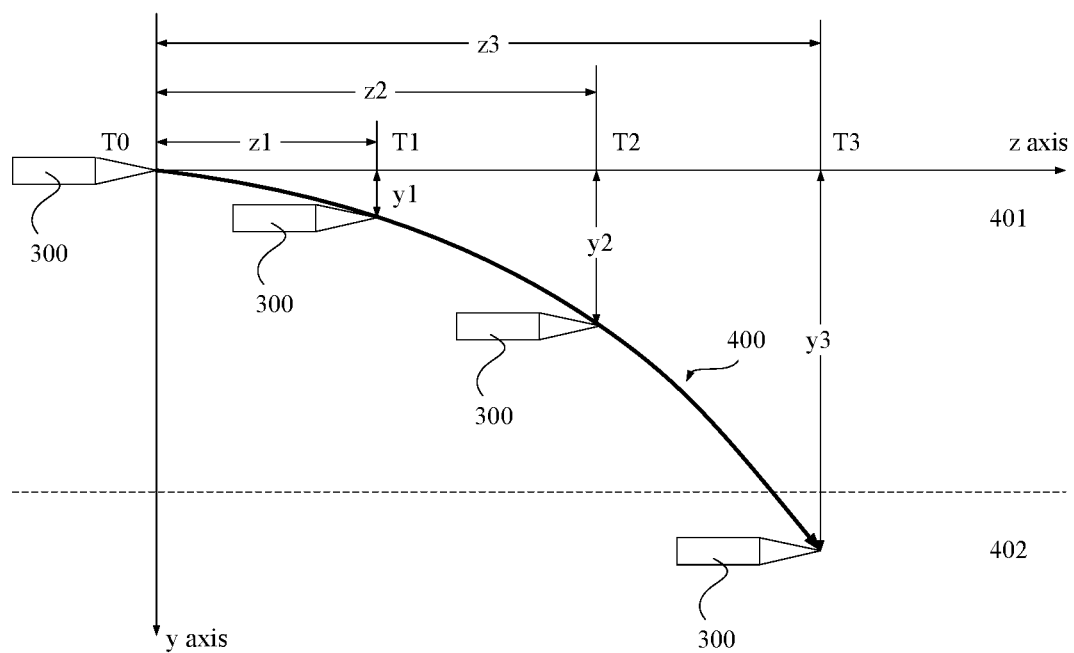
FIG. 4 is a diagram of a ballistic trajectory of an attack item in a virtual environment according to an exemplary embodiment of this application.

The terminal may learn, by calculating a ballistic trajectory of the attack item, the at least two media through which the attack item passes in the flight process before hitting the target object. FIG. 4 shows a diagram of a ballistic trajectory of an attack item according to an exemplary embodiment of this application. As shown in FIG. 4, in a case that speed attenuation is not considered, a ballistic trajectory 400 of an attack item 300 is in the shape of a parabola. The ballistic trajectory 400 may be split into a horizontal displacement $s_1$ in a horizontal direction and a vertical displacement 52 in a vertical direction of the attack item, where the horizontal displacement $s_1 = V_0 t$, the vertical displacement $s_2 = \frac{1}{2}(Gt^2)$, $V_0$ is an initial speed of the attack item 300, G is a gravitational acceleration preset in an application program of the virtual environment, and a time t is a quantity of frames for which a picture of the virtual environment in a flight process of a bullet is displayed.

The center of a bullet head of the attack item 300 is used as reference coordinates. If reference coordinates of the attack item 300 at a moment T0 at which the attack item is just shot are (0, 0) and the initial speed $V_0$ is in a direction of a y axis, reference coordinates of the attack item at a moment T1 are (z1, y1), reference coordinates of the attack item at a moment T2 are (z2, y2), and reference coordinates at a moment T3 are (z3, y3), where a z coordinate of the reference coordinates is a horizontal displacement of the attack item 300 in the horizontal direction, and a y coordinate of the reference coordinates is a vertical displacement of the attack item 300 in the vertical direction. The terminal may obtain the ballistic trajectory 400 of the attack item 300 by calculating the horizontal displacement z and the vertical displacement y of the attack item 300 at each moment. Meanwhile, the terminal may obtain a location in which the attack item 300 appears at each moment according to the horizontal displacement z and the vertical displacement y of the attack item 300 at each moment, to learn the media through which the attack item 300 passes in the flight process. For example, as shown in FIG. 3, the reference coordinates of the attack item 300 at the moments T0, T1, and T2 are located in the first medium, and the reference coordinates of the attack item at the moment T3 are located in the second medium. If the attack item 300 hits the target object at the moment T3, it is determined that the attack item 300 passes through two media in the flight process, namely, a first medium 401 and a second medium 402.

Figure 5:
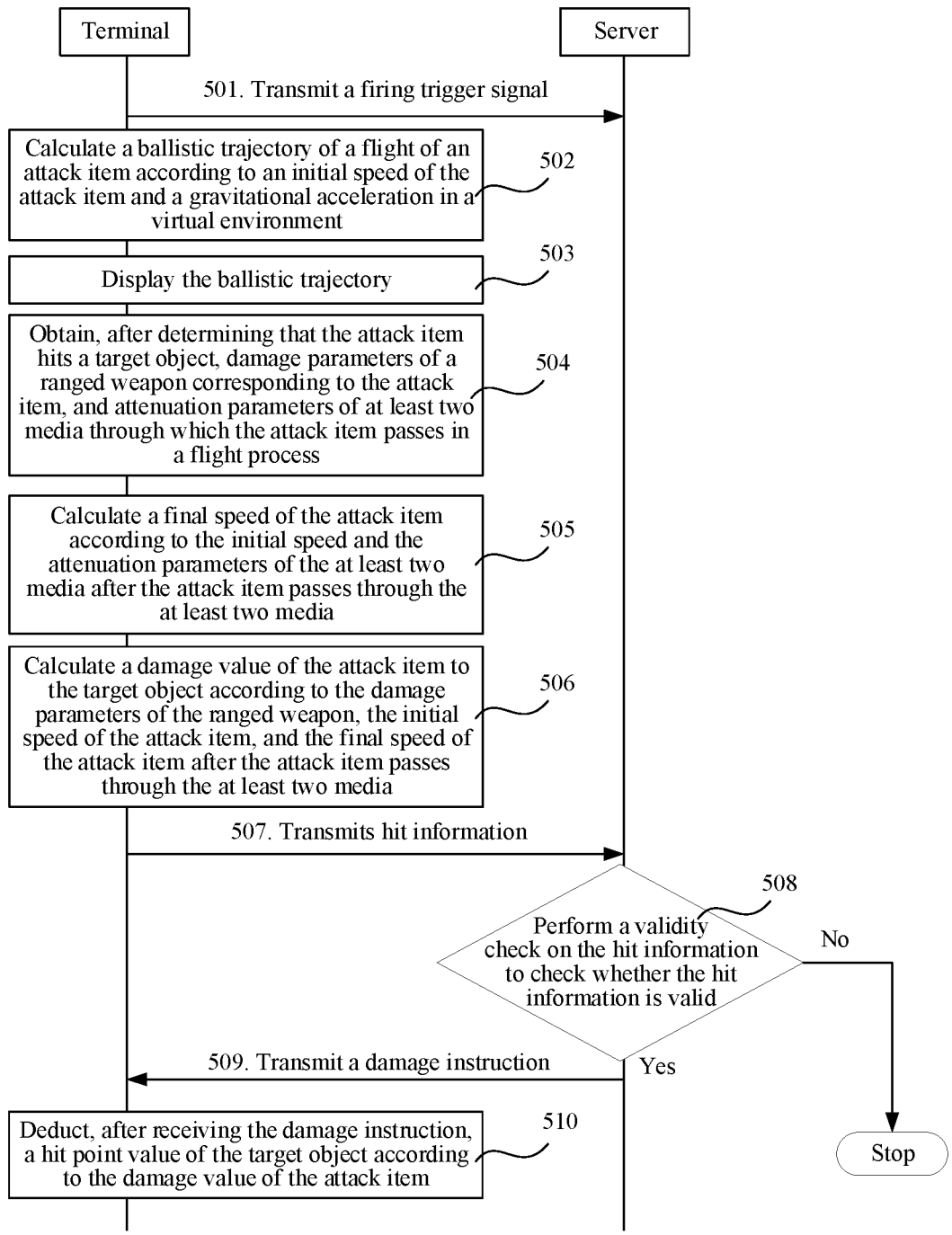
FIG. 5 is a flowchart of a method for obtaining a damage value of an attack item according to an exemplary embodiment of this application.

FIG. 5 shows a flowchart of a method for obtaining a damage value of an attack item in a virtual environment according to an exemplary embodiment of this application. The method may be applied to the computer system in the embodiment of FIG. 1, and the method includes:

Step 501. A terminal transmits a firing trigger signal to a server.

Exemplarily, in a case of running an application program corresponding to the virtual environment, when virtual objects controlled by different terminals move in the virtual environment, reference coordinates of every virtual object and item in the virtual environment are reported to the server every preset time. After the user controls the virtual object to use a ranged weapon to shoot an attack item at the target object, a firing trigger signal is generated, the terminal obtains an initial speed and initial reference coordinates of the attack item in a case that the firing trigger signal is received, and transmits the firing trigger signal to the server, where the firing trigger signal carries the initial speed of the attack item, the initial reference coordinates of the attack item, and a first timestamp corresponding to the initial speed and the initial reference coordinates. The server receives and stores the initial speed, the initial reference coordinates, and the first timestamp.

Step 502: The terminal calculates a ballistic trajectory of a flight of an attack item according to an initial speed of the attack item and a gravitational acceleration in a virtual environment.

Exemplarily, the terminal obtains an initial speed $V_0$ of the attack item, and a gravitational acceleration G preset in the virtual environment, and calculates a ballistic trajectory of the attack item through the following formula:

$$s_1 = V_0 t$$
$$s_2 = \frac{1}{2} G t^2$$

where $s_1$ is a horizontal displacement of the attack item in a horizontal direction, $s_2$ is a vertical displacement of the attack item in a vertical direction, $V_0$ is the initial speed of the attack item, G is the gravitational acceleration in the virtual environment, and t is a flight time of the attack item.

Step 503: The terminal displays the ballistic trajectory.

The terminal obtains initial reference coordinates of the attack item, and obtains reference coordinates of the attack item in each frame of picture according to flight distances of the attack item in the horizontal direction and in the vertical direction in each frame of picture, to display the attack item in a location of the reference coordinates in each frame of picture, to further display the ballistic trajectory of the attack item in a process from shooting the attack item to hitting the target object.

Exemplarily, after the user controls the virtual object to use a ranged weapon to shoot an attack item at the target object, attack item shooting information is triggered, and the terminal generates an attack item and initial reference coordinates ($z_0$, $y_0$) of the attack item according to the attack item shooting information, where $z_0$ is a coordinate of the attack item in an initial horizontal direction, and $y_0$ is a coordinate of the attack item in an initial vertical direction; the terminal obtains a z-axis coordinate of the attack item in each frame of picture according to the horizontal displacement $s_1$ of the attack item in the horizontal direction; the terminal obtains a y-axis coordinate of the attack item in each frame of picture according to the vertical displacement $s_2$ of the attack item in the vertical direction, so that the terminal obtains reference coordinates of the attack item in each frame of picture according to the z-axis coordinate and the y-axis coordinate of the attack item in each frame of picture, to further display the attack item in a location of the reference coordinates in each frame of picture, to form a ballistic trajectory.

Step 504: The terminal obtains, in a case of determining that the attack item hits a target object, damage parameters of a ranged weapon corresponding to the attack item, and attenuation parameters of at least two media through which the attack item passes in a flight process.

Exemplarily, when the reference coordinates of the attack item coincide with coordinates of the target object, the terminal determines that the attack item hits the target object, and obtains the damage parameters of the ranged weapon corresponding to the attack item and the attenuation parameters of the at least two media through which the attack item passes in the flight process.

Step 505: The terminal calculates a final speed of the attack item according to the initial speed and the attenuation parameters of the at least two media after the attack item passes through the at least two media.

Exemplarily, the terminal calculates according to an initial speed $V_0$ of the attack item and a first attenuation parameter $a_1$ of a first medium through which the attack item passes, that the speed of the attack item is attenuated from the initial speed $V_0$ to a first speed $V_1$ after the attack item passes through the first medium; calculates according to the speed $V_1$ after the attack item passes through the first medium and a second attenuation parameter $a_2$ of a second medium through which the attack item passes, that the speed of the attack item is attenuated from the first speed $V_1$ to a second speed $V_2$ after the attack item passes through the second medium; and by analogy, after the attack item passes through an $n^{th}$ medium, the terminal calculates according to a speed $V_{n-1}$ after the attack item passes through an $(n-1)^{th}$ medium and an attenuation parameter an of the $n^{th}$ medium, that the speed of the attack item is attenuated from an $(n-1)^{th}$ speed $V_{n-1}$ to an $n^{th}$ speed $V_n$, where the $(n-1)^{th}$ speed is a speed after the attack item passes through the $(n-1)^{th}$ medium, and the $n^{th}$ speed is a final speed of the attack item, where n is a natural number, and n≥2.

Optionally, the terminal calculates, according to an $(i-1)^{th}$ speed, $i^{th}$ attenuation parameters of an $i^{th}$ medium, and a quantity of frames for which the attack item needs to fly in a case that the attack item passes through the $i^{th}$ medium, an $i^{th}$ speed through the following formula:

$$V_i = V_{i-1} - (k_i - 1)\square(a_i V_0^2 + b_i V_0)$$

where $V_i$ is the $i^{th}$ speed, $V_{i-1}$ is the $(i-1)^{th}$ speed, $V_0$ is the initial speed, $a_i$ and $b_i$ are the $i^{th}$ attenuation parameters, $k_i$ is the quantity of frames for which the attack item needs to fly in a case that the attack item passes through the $i^{th}$ medium, i is a natural number, and 1≤i≤n. In a case that i is equal to 1, $V_{i-1}$ is the initial speed $V_0$; and in a case that i is equal to n, $V_i$ is the final speed $V_n$.

Step 506: The terminal calculates a damage value of the attack item to the target object according to the damage parameters of the ranged weapon, the initial speed of the attack item, and the final speed of the attack item after the attack item passes through the at least two media.

Exemplarily, the damage value of the attack item to the target object and the speed of the attack item are related to the damage parameters of the ranged weapon. For example, in a virtual environment, damage parameters of a rifle are higher than damage parameters of a pistol, a damage value contribution of the rifle to the target object is larger than that of the pistol to the target object, and a damage value contribution of an attack item of which a speed is high is larger than that of an attack item of which a speed is low. Besides, the speed of the attack item is attenuated in a process of flying in a medium, so that a case that the speed of the attack item is attenuated from the initial speed to the final speed after the attack item passes through at least two media needs to be considered. Therefore, the terminal may calculate the damage value of the attack item to the target object according to the damage parameters of the ranged weapon, the initial speed of the attack item, and the final speed of the attack item after the attack item passes through the at least two media.

The damage value of the attack item to the target object is determined according to the speed of the attack item and the damage parameters of the ranged weapon corresponding to the attack item, and the speed of the attack item is attenuated in a case that the attack item passes through one medium, so that the damage value of the attack item to the target object after the speed is attenuated may be calculated according to the initial speed of the attack item and the final speed of the attack item through the following formula:

$$Y = e\square\left(\frac{V_n}{V_0}\right)^2 + f\square\left(\frac{V_n}{V_0}\right)$$

where Y is the damage value of the attack item to the target object, $V_n$ is the final speed, $V_0$ is the initial speed, and e and f are the damage parameters of the ranged weapon.

Step 507. The terminal transmits hit information to the server.

Exemplarily, after obtaining the damage value of the attack item, the terminal transmits hit information to the server, where the hit information carries final reference coordinates of the attack item in a case that the attack item hits the target object, a second timestamp corresponding to the final reference coordinates, and the damage value.

Step 508: The server performs a validity check on the hit information to check whether the hit information is valid.

Exemplarily, the server obtains a flight time of the attack item according to the first timestamp and the second timestamp, and calculates the final reference coordinates of the attack item within the flight time according to the initial speed of the attack item, the gravitational acceleration, and initial reference coordinates. If the final reference coordinates calculated by the server are the same as the final reference coordinates transmitted by the terminal, it is determined that the hit information is valid, and step 509 is entered; and if the final reference coordinates calculated by the server are different from the final reference coordinates transmitted by the terminal, it is determined that the hit information is invalid, and this step is stopped.

Step 509: The server transmits a damage instruction to the terminal.

After determining that the hit information is valid, the server transmits a damage instruction to the terminal.

When the virtual object shooting the attack item is the first virtual object controlled by the first terminal, and there is a second virtual object controlled by at least one second terminal in the same virtual environment, if the server determines that the damage value transmitted by the terminal is valid, the server transmits a damage instruction to the first terminal, and the first terminal deducts a hit point value or an endurance value of the target object according to the damage value after receiving the damage instruction; the server transmits a damage instruction to the at least one second terminal, the damage instruction carrying the damage value, and after receiving the damage instruction, the at least one second terminal respectively deducts the hit point value or the endurance value of the target object according to the damage value carried in the damage instruction. The target object may be the second virtual object, or may be a living thing or a non-living thing in the virtual environment.

Step 510: The terminal deducts, after receiving the damage instruction, a hit point value of the target object according to the damage value of the attack item.

Exemplarily, after the terminal receives the damage instruction transmitted by the server, in a case that the damage value of the attack item is 120, the target object is a body armor, and a protection level of the body armor is 1 (that is, a damage value 10% can be offset), the terminal deducts an endurance value 110 of the body armor; and in a case that the target object is a virtual object controlled by another terminal, and the virtual object is not equipped with an armor, the terminal directly deducts a hit point value 120 of the virtual object.

Based on the above, in this embodiment of this application, the attenuation parameters of the at least two media through which the attack item passes in the flight process before hitting the target object are obtained, the damage value of the attack item to the target object after the attack item passes through the at least two media is calculated according to the attenuation parameters of the at least two media, and the hit point value or the endurance value of the target object is deducted according to the damage value. The damage value is calculated according to the attenuation parameters of the at least two media, so that a problem that in the related art, the influence of the environment is not considered in the calculation of the damage value of the attack item, leading to a relatively poor simulation effect of the virtual environment is resolved, thereby improving trueness of the virtual environment.

Optionally, in this embodiment of this application, the final speed of the attack item after the attack item passes through the at least two media is calculated according to the initial speed of the attack item and the attenuation parameters of the at least two media; and the damage value of the attack item to the target object is calculated according to the initial speed and the final speed, so that a scene that the damage of the attack item is attenuated after passing through at least two media can be really simulated, thereby improving trueness of the virtual environment.

Optionally, in this embodiment of this application, reference coordinates of the attack item in each frame of picture in the flight process are calculated by obtaining the initial speed of the attack item and the gravitational acceleration preset in the virtual environment, and the attack item is displayed in a location of the reference coordinate in each frame of picture, so that a ballistic trajectory of the attack item in the virtual environment can be really simulated, thereby improving trueness of the virtual environment.

Figure 6:
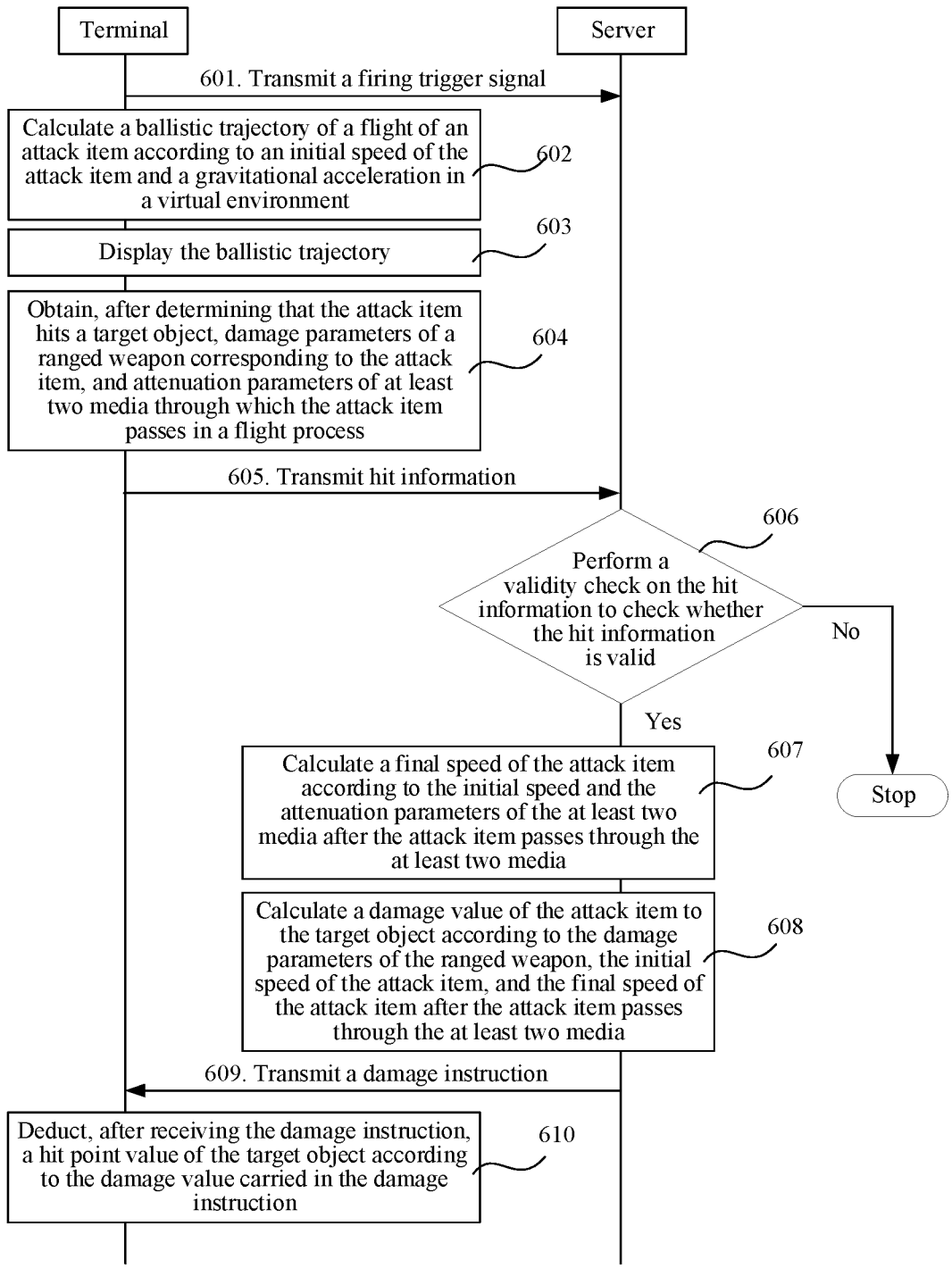
FIG. 6 is a flowchart of a method for obtaining a damage value of an attack item according to an exemplary embodiment of this application.

FIG. 6 shows a flowchart of a method for obtaining a damage value of an attack item in a virtual environment according to an exemplary embodiment of this application. The method may be applied to the computer system in the embodiment of FIG. 1, and the method includes:

Step 601. A terminal transmits a firing trigger signal to a server.

Exemplarily, in a case of running an application program corresponding to the virtual environment, when virtual objects controlled by different terminals move in the virtual environment, reference coordinates of every virtual object and item in the virtual environment are reported to the server every preset time. After the user controls the virtual object to use a ranged weapon to shoot an attack item at the target object, a firing trigger signal is generated, the terminal obtains an initial speed and initial reference coordinates of the attack item in a case that the firing trigger signal is received, and transmits the firing trigger signal to the server, where the firing trigger signal carries the initial speed of the attack item, the initial reference coordinates of the attack item, and a first timestamp corresponding to the initial speed and the initial reference coordinates. The server receives and stores the initial speed, the initial reference coordinates, and the first timestamp.

Step 602: The terminal calculates a ballistic trajectory of a flight of an attack item according to an initial speed of the attack item and a gravitational acceleration in a virtual environment.

Exemplarily, the terminal obtains an initial speed V0 of the attack item, and a gravitational acceleration G preset in the virtual environment, and calculates a ballistic trajectory of the attack item through the following formula:

$$s_1 = V_0 t$$
$$s_2 = \frac{1}{2} G t^2$$

where $s_1$ is a horizontal displacement of the attack item in a horizontal direction, $s_2$ is a vertical displacement of the attack item in a vertical direction, $V_0$ is the initial speed of the attack item, G is the gravitational acceleration in the virtual environment, and t is a flight time of the attack item.

Step 603: The terminal displays the ballistic trajectory.

The terminal obtains initial reference coordinates of the attack item, and obtains reference coordinates of the attack item in each frame of picture according to flight distances of the attack item in the horizontal direction and in the vertical direction in each frame of picture, to display the attack item in a location of the reference coordinates in each frame of picture, to further display the ballistic trajectory of the attack item in a process from shooting the attack item to hitting the target object.

Exemplarily, after the user controls the virtual object to use a ranged weapon to shoot an attack item at the target object, attack item shooting information is triggered, and the terminal generates an attack item and initial reference coordinates ($z_0$, $y_0$) of the attack item according to the attack item shooting information, where $z_0$ is a coordinate of the attack item in an initial horizontal direction, and $y_0$ is a coordinate of the attack item in an initial vertical direction; the terminal obtains a z-axis coordinate of the attack item in each frame of picture according to the horizontal displacement $s_1$ of the attack item in the horizontal direction; the terminal obtains a y-axis coordinate of the attack item in each frame of picture according to the vertical displacement $s_2$ of the attack item in the vertical direction, so that the terminal obtains reference coordinates of the attack item in each frame of picture according to the z-axis coordinate and the y-axis coordinate of the attack item in each frame of picture, to further display the attack item in a location of the reference coordinates in each frame of picture, to form a ballistic trajectory.

Step 604: The terminal obtains, in a case of determining that the attack item hits a target object, damage parameters of a ranged weapon corresponding to the attack item, and attenuation parameters of at least two media through which the attack item passes in a flight process.

Exemplarily, when the reference coordinates of the attack item coincide with coordinates of the target object, the terminal determines that the attack item hits the target object, and obtains the damage parameters of the ranged weapon corresponding to the attack item and the attenuation parameters of the at least two media through which the attack item passes in the flight process.

Step 605. The terminal transmits hit information to the server.

Exemplarily, the terminal transmits the hit information to the server, the hit information carries final reference coordinates of the attack item in a case that the attack item hits the target object, a second timestamp corresponding to the final reference coordinates, the damage parameters of the ranged weapon, and the attenuation parameters of the at least two media through which the attack item passes in the flight process.

Step 606: The server performs a validity check on the hit information to check whether the hit information is valid.

Exemplarily, the server obtains a flight time of the attack item according to the first timestamp and the second timestamp, and calculates the final reference coordinates of the attack item within the flight time according to the initial speed of the attack item, the gravitational acceleration, and initial reference coordinates. If the final reference coordinates calculated by the server are the same as the final reference coordinates transmitted by the terminal, it is determined that the hit information is valid, and step 607 is entered; and if the final reference coordinates calculated by the server are different from the final reference coordinates transmitted by the terminal, it is determined that the hit information is invalid, and this step is stopped.

Step 607: The server calculates a final speed of the attack item according to the initial speed and the attenuation parameters of the at least two media after the attack item passes through the at least two media.

Exemplarily, the server calculates according to an initial speed $V_0$ of the attack item and a first attenuation parameter $a_1$ of a first medium through which the attack item passes, that the speed of the attack item is attenuated from the initial speed $V_0$ to a first speed $V_1$ after the attack item passes through the first medium; calculates according to the speed $V_1$ after the attack item passes through the first medium and a second attenuation parameter $a_2$ of a second medium through which the attack item passes, that the speed of the attack item is attenuated from the first speed $V_1$ to a second speed $V_2$ after the attack item passes through the second medium; and by analogy, after the attack item passes through an $n^{th}$ medium, the terminal calculates according to a speed $V_{n-1}$ after the attack item passes through an $(n-1)^{th}$ medium and an attenuation parameter an of the $n^{th}$ medium, that the speed of the attack item is attenuated from an $(n-1)^{th}$ speed $V_{n-1}$ to an $n^{th}$ speed $V_n$, where the $(n-1)^{th}$ speed is a speed after the attack item passes through the $(n-1)^{th}$ medium, and the $n^{th}$ speed is a final speed of the attack item, where n is a natural number, and n≥2.

Optionally, the terminal calculates, according to an $(i-1)^{th}$ speed, $i^{th}$ attenuation parameters of an $i^{th}$ medium, and a quantity of frames for which the attack item needs to fly in a case that the attack item passes through the $i^{th}$ medium, an $i^{th}$ speed through the following formula:

$$V_i = V_{i-1} - (k_i - 1)\Box(a_i V_0^2 + b_i V_0)$$

where $V_i$ is the $i^{th}$ speed, $V_{i-1}$ is the $(i-1)^{th}$ speed, $V_0$ is the initial speed, $a_i$ and $b_i$ are the $i^{th}$ attenuation parameters, $k_i$ is the quantity of frames for which the attack item needs to fly in a case that the attack item passes through the $i^{th}$ medium, i is a natural number, and 1≤i≤n. In a case that i is equal to 1, $V_{i-1}$ is the initial speed $V_0$; and in a case that i is equal to n, $V_i$ is the final speed $V_n$.

Step 608: The server calculates a damage value of the attack item to the target object according to the damage parameters of the ranged weapon, the initial speed of the attack item, and the final speed of the attack item after the attack item passes through the at least two media.

The damage value of the attack item to the target object is determined according to the speed of the attack item and the damage parameters of the ranged weapon corresponding to the attack item, and the speed of the attack item is attenuated in a case that the attack item passes through one medium, so that the server may calculate the damage value of the attack item to the target object after the speed is attenuated according to the initial speed of the attack item and the final speed of the attack item through the following formula:

$$Y = e\Box\left(\frac{V_n}{V_0}\right)^2 + f\Box\left(\frac{V_n}{V_0}\right)$$

where Y is the damage value of the attack item to the target object, $V_n$ is the final speed, $V_0$ is the initial speed, and e and f are the damage parameters of the ranged weapon.

Step 609: The server transmits a damage instruction to the terminal.

After determining that the hit information is valid, the server transmits a damage instruction to the terminal, the damage instruction carrying the damage value of the attack item.

When the virtual object shooting the attack item is the first virtual object controlled by the first terminal, and there is a second virtual object controlled by at least one second terminal in the same virtual environment, if the server determines that the damage value transmitted by the terminal is valid, the server transmits a damage instruction to the first terminal, and the first terminal deducts a hit point value or an endurance value of the target object according to the damage value after receiving the damage instruction; the server transmits a damage instruction to the at least one second terminal, the damage instruction carrying the damage value, and after receiving the damage instruction, the at least one second terminal respectively deducts the hit point value or the endurance value of the target object according to the damage value carried in the damage instruction. The target object may be the second virtual object, or may be a living thing or a non-living thing in the virtual environment.

Step 610: The terminal deducts, after receiving the damage instruction, a hit point value of the target object according to the damage value carried in the damage instruction.

Exemplarily, after the terminal receives the damage instruction transmitted by the server, in a case that the damage value carried in the damage instruction is 120, the target object is a body armor, and a protection level of the body armor is 1 (that is, a damage value 10% can be offset), the terminal deducts an endurance value 110 of the body armor; and in a case that the target object is a virtual object controlled by another terminal, and the virtual object is not equipped with an armor, the terminal directly deducts a hit point value 120 of the virtual object.

Based on the above, in this embodiment of this application, the attenuation parameters of the at least two media through which the attack item passes in the flight process before hitting the target object are obtained, the damage value of the attack item to the target object after the attack item passes through the at least two media is calculated according to the attenuation parameters of the at least two media, and the hit point value or the endurance value of the target object is deducted according to the damage value. The damage value is calculated according to the attenuation parameters of the at least two media, so that a problem that in the related art, the influence of the environment is not considered in the calculation of the damage value of the attack item, leading to a relatively poor simulation effect of the virtual environment is resolved, thereby improving trueness of the virtual environment.

Optionally, in this embodiment of this application, the final speed of the attack item after the attack item passes through the at least two media is calculated according to the initial speed of the attack item and the attenuation parameters of the at least two media; and the damage value of the attack item to the target object is calculated according to the initial speed and the final speed, so that a scene that the damage of the attack item is attenuated after passing through at least two media can be really simulated, thereby improving trueness of the virtual environment.

Optionally, in this embodiment of this application, reference coordinates of the attack item in each frame of picture in the flight process are calculated by obtaining the initial speed of the attack item and the gravitational acceleration preset in the virtual environment, and the attack item is displayed in a location of the reference coordinate in each frame of picture, so that a ballistic trajectory of the attack item in the virtual environment can be really simulated, thereby improving trueness of the virtual environment.

Figure 7:
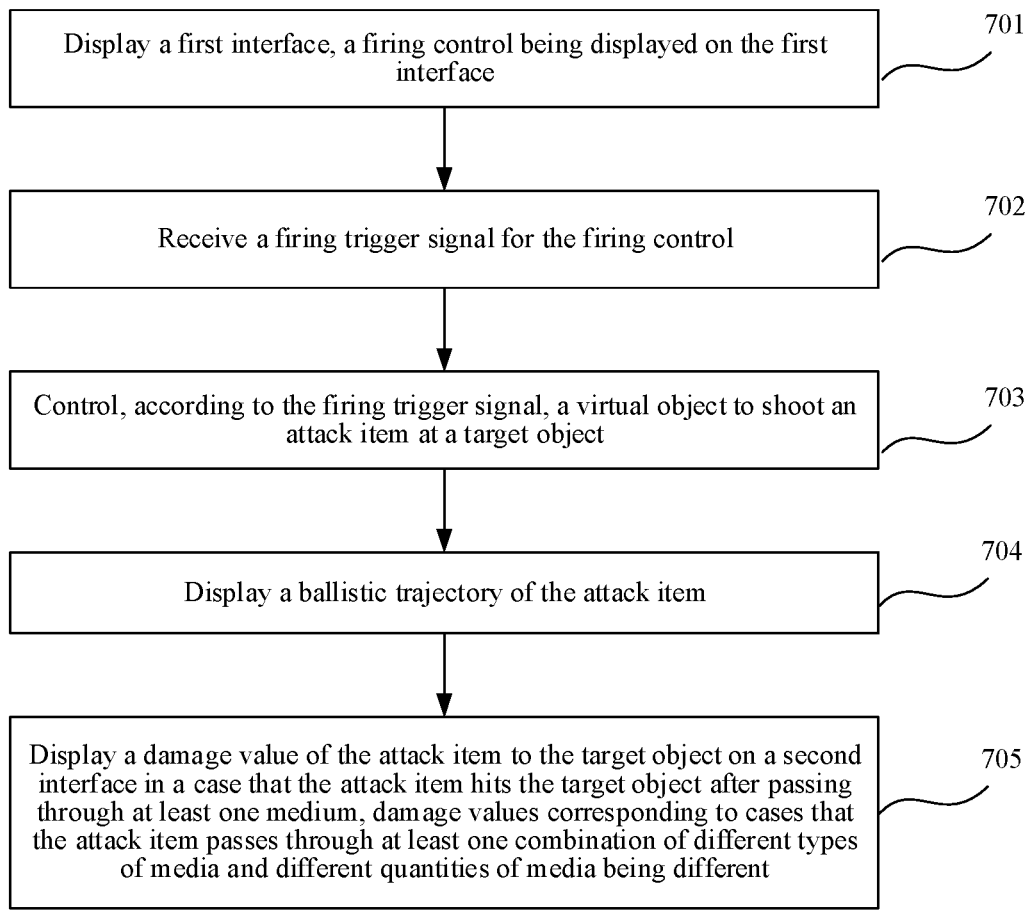
FIG. 7 is a flowchart of a method for displaying a damage value of an attack item according to an exemplary embodiment of this application.

FIG. 7 shows a flowchart of a method for displaying a damage value of an attack item in a virtual environment according to an exemplary embodiment of this application. The method may be applied to the first terminal 120 or the second terminal 160 in the embodiment of FIG. 1, and the method includes:

Step 701: Display a first interface, a firing control being displayed on the first interface.

Exemplarily, a terminal displays a first interface when running an application program of the virtual environment, a firing control being displayed on the first interface, where the firing control is a control corresponding to shooting an attack item. Optionally, a virtual object controlled by the terminal and a target object are further displayed on the first interface.

Figure 8:
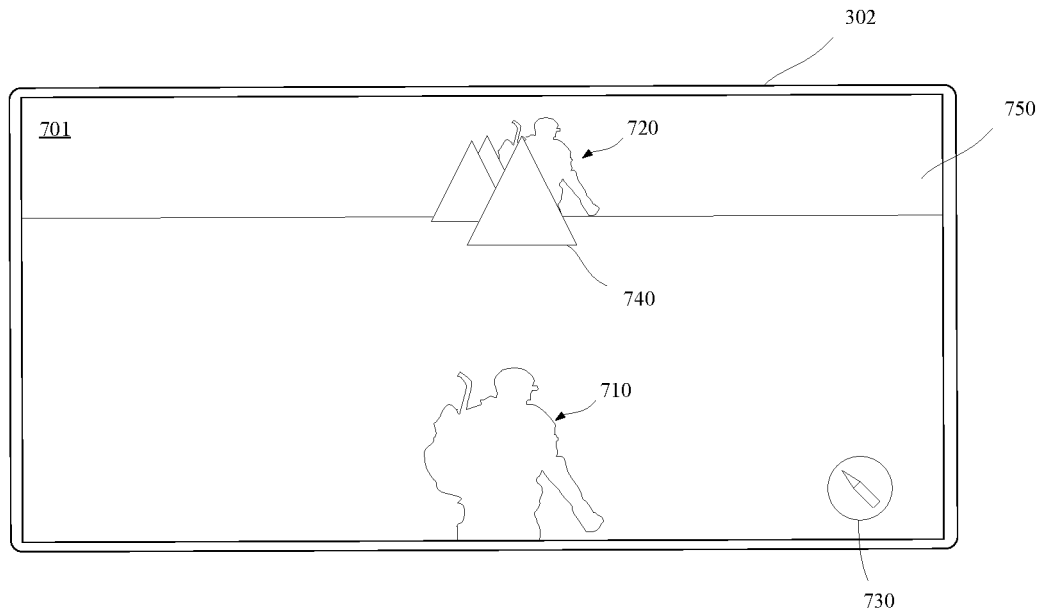
FIG. 8 is a schematic diagram of a first interface of a virtual environment according to an exemplary embodiment of this application.

As shown in FIG. 8, a first interface 701 of a virtual environment is displayed on the display screen 302 of the terminal, and a virtual object 710 controlled by the terminal, a target object 720 hiding behind a mound 740, and a firing control 730 are displayed on the first interface. If the application program is a first-person viewing angle game, the virtual object is not displayed on the first interface 701; and if the target object is not within a field of view of the virtual object, the target object is not displayed either.

Step 702: Receive a firing trigger signal for the firing control.

Exemplarily, a user touches or taps the firing control to trigger generation of a firing trigger signal, and the terminal receives the firing trigger signal.

Step 703: Control, according to the firing trigger signal, a virtual object to shoot an attack item at a target object.

Exemplarily, the terminal controls, according to the firing trigger signal, the virtual object to shoot an attack item at the target object. The terminal may display that the virtual object fires at the target object in a manner of sound effect, or display that the virtual object fires at the target object in a manner of displaying smog.

Step 704: Display a ballistic trajectory.

Exemplarily, after the terminal controls the virtual object to shoot an attack item at the target object, the terminal displays a second interface, and a ballistic trajectory of the attack item is displayed on the second interface.

Optionally, the terminal may calculate the ballistic trajectory of the attack item by using the method in the foregoing embodiments.

Step 705: Display a damage value of the attack item to the target object on a second interface in a case that the attack item hits the target object after passing through at least two media, damage values corresponding to cases that the attack item passes through at least one combination of different types of media and different quantities of media being different.

Exemplarily, the attack item passes through at least one medium in a flight process before hitting the target object, and in a case that the attack item hits the target object, a damage value of the attack item to the target object is displayed on the second interface. Damage values corresponding to cases that the attack item passes through different types of media are different, damage values corresponding to cases that the attack item passes through different quantities of media are also different, and damage values corresponding to cases that the attack item passes through different types of media and different quantities of media are different. For example, damage values corresponding to cases that the attack item passes through one medium and passes through at least two media are different; damage values corresponding to cases that the attack item passes through a first type of medium and passes through a second type of medium are different; and damage values corresponding to cases that the attack item passes through the first type of medium and passes through the second type of medium and a third type of medium are different.

Optionally, after receiving the damage instruction of the server, the terminal deducts, according to the damage value of the attack item obtained through local calculation, a hit point value or an endurance value of the target object, and displays the deducted hit point value or endurance value. The terminal may calculate the damage value of the attack item to the target object according to the embodiment of FIG. 2 or FIG. 5.

Optionally, the terminal receives the damage instruction of the server, deducts a hit point value or an endurance value of the target object according to the damage value of the attack item carried in the damage instruction, and displays the deducted hit point value or endurance value. The server may calculate the damage value of the attack item to the target object according to the embodiment of FIG. 2 or FIG. 6.

Figure 9:
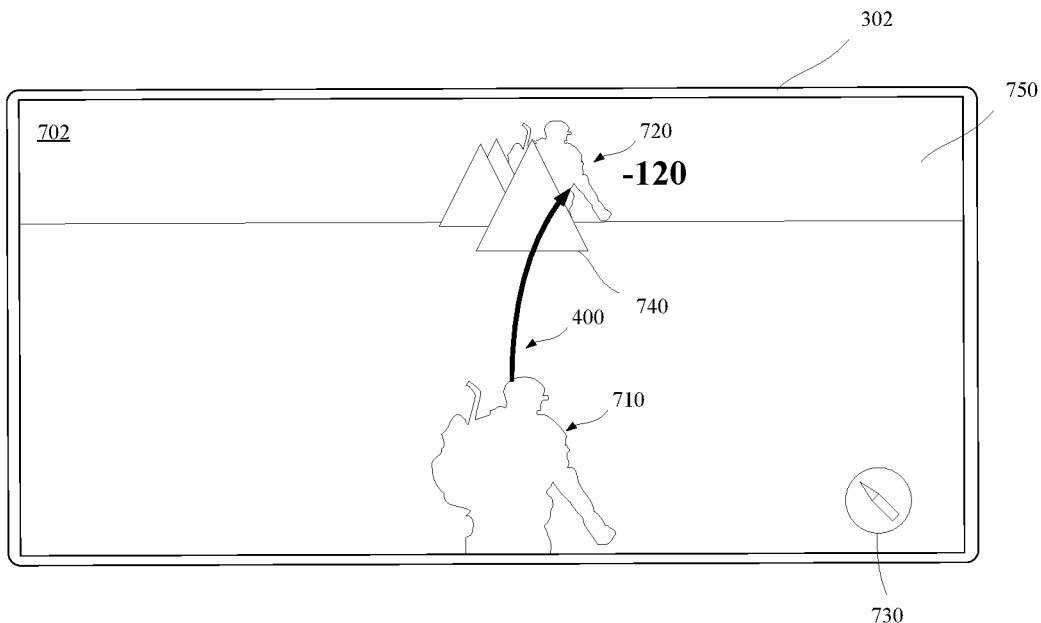
FIG. 9 is a schematic diagram of displaying damage of an attack item on a second interface of a virtual environment according to an exemplary embodiment of this application.
Figure 10:
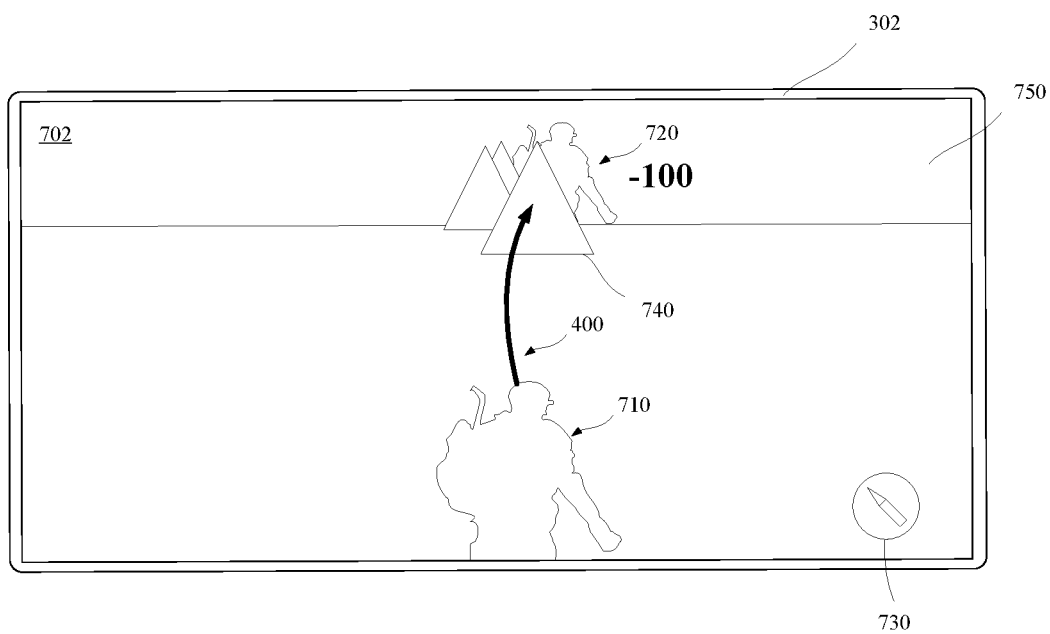
FIG. 10 is a schematic diagram of displaying damage of an attack item on a second interface of a virtual environment according to an exemplary embodiment of this application.

Exemplarily, as shown in FIG. 9, a second interface 702 of the virtual environment is displayed on the display screen 302 of the terminal, a ballistic trajectory 400 is displayed on a second display interface 702, and when the attack item passes through the one medium of the air 750 and hits the target object 720, the damage value to the target object is displayed as "−120"; and as shown in FIG. 10, the second interface 702 of the virtual environment is displayed on the display screen 302 of the terminal, the ballistic trajectory 400 is displayed on the second display interface 702, and when the attack item passes through the two media of the air 750 and the mound 740 and hits the target object 720, the damage value to the target object is displayed as "−100".

Based on the above, in this embodiment of this application, the damage value of the virtual object to the target object is displayed on the second interface. The damage value corresponding to a case that the attack item passes through at least two media is different from the damage value corresponding to a case that the attack item passes through one medium, so that a problem that in the related art, the influence of the environment is not considered in the calculation of the damage value of the attack item, leading to a relatively poor simulation effect of the virtual environment is resolved, thereby improving trueness of the virtual environment.

It is to be understood that steps in flowcharts of FIG. 2, FIG. 5, FIG. 6 and FIG. 7 are displayed in sequence based on indication of arrows, but the steps are not necessarily performed in sequence based on a sequence indicated by the arrows. Unless otherwise explicitly specified in this application, execution of the steps is not strictly limited, and the steps may be performed in other sequences. In addition, at least some steps in FIG. 2, FIG. 5, FIG. 6 and FIG. 7 may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

Figure 11:
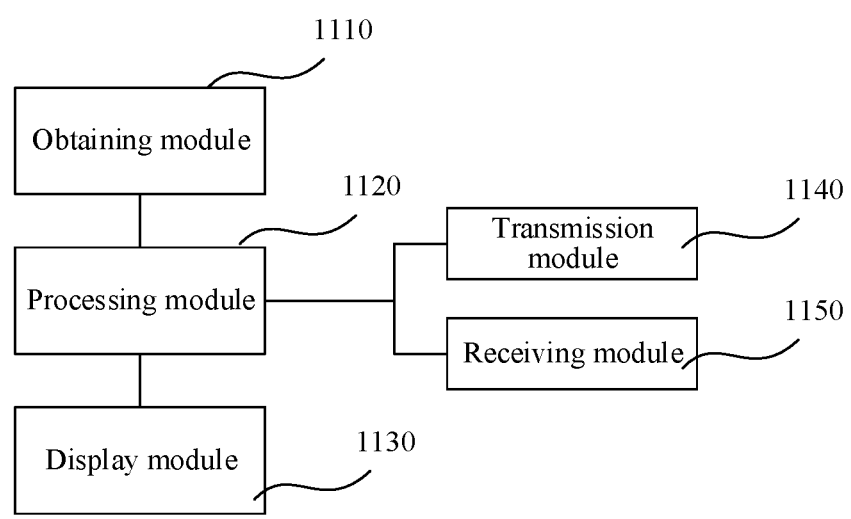
FIG. 11 is a structural block diagram of an apparatus for obtaining a damage value of an attack item in a virtual environment according to an exemplary embodiment of this application.

FIG. 11 shows a structural block diagram of an apparatus for obtaining a damage value of an attack item in a virtual environment according to an exemplary embodiment of this application. The apparatus may be applied to the server 140, the first terminal 120, or the second terminal 160 in the embodiment of FIG. 1. The apparatus includes an obtaining module 1110, a processing module 1120, a display module 1130, a transmission module 1140, and a receiving module 1150, where the display module 1130, the transmission module 1140, and the receiving module 1150 are optional modules.

The obtaining module 1110 is configured to obtain, after determining that an attack item shot by a virtual object controlled by a terminal hits a target object, attenuation parameters of at least two media through which the attack item passes in a flight process before hitting the target object.

The processing module 1120 is configured to calculate a damage value of the attack item to the target object according to the attenuation parameters of the at least two media after the attack item passes through the at least two media; and deduct a hit point value of the target object according to the damage value.

In an optional embodiment, the obtaining module 1110 is further configured to obtain an initial speed of the attack item.

The processing module 1120 is further configured to calculate a final speed of the attack item according to the initial speed and the attenuation parameters of the at least two media after the attack item passes through the at least two media; and calculate the damage value according to the initial speed and the final speed.

In an optional embodiment, the processing module 1120 is further configured to calculate an $i^{th}$ speed of the attack item after passing through an $i^{th}$ medium according to an speed and $i^{th}$ attenuation parameters of the $i^{th}$ medium, where i is a natural number, and i≥1; and the $(i-1)^{th}$ speed is a speed of the attack item after passing through an $(i-1)^{th}$ medium, where the $(i-1)^{th}$ speed is the initial speed in a case that i is equal to 1, and the $i^{th}$ speed is the final speed in a case that i is a maximum value.

In an optional embodiment, the processing module 1120 is further configured to calculate, according to an $(i-1)^{th}$ speed, $i^{th}$ attenuation parameters, and a quantity of frames for which the attack item needs to fly in a case that the attack item passes through the $i^{th}$ medium, an $i^{th}$ speed through the following formula:

$$V_i = V_{i-1} - (k_i - 1)\Box(a_i V_0^2 + b_i V_0)$$

where $V_i$ is the $i^{th}$ speed, is the $(i-1)^{th}$ speed, $V_0$ is the initial speed, $a_i$ and $b_i$ are the $i^{th}$ attenuation parameters, and $k_i$ is the quantity of frames for which the attack item needs to fly in a case that the attack item passes through the $i^{th}$ medium.

In an optional embodiment, the obtaining module 1110 is further configured to obtain damage parameters of a ranged weapon corresponding to the attack item.

The processing module 1120 is further configured to calculate the damage value according to the damage parameters of the ranged weapon, the initial speed, and the final speed.

In an optional embodiment, the processing module 1120 is further configured to calculate the damage value according to the damage parameters of the ranged weapon, the initial speed, and the final speed through the following formula:

$$Y = e\Box\left(\frac{V_n}{V_0}\right)^2 + f\Box\left(\frac{V_n}{V_0}\right)$$

where Y is the damage value, $V_n$ is the final speed, $V_0$ is the initial speed, and e and f are the damage parameters of the ranged weapon.

In an optional embodiment, the processing module 1120 is further configured to calculate a flight distance of the attack item according to the initial speed, a gravitational acceleration, and a flight time of the attack item, the gravitational acceleration being a parameter preset in an application program on which the virtual environment is run.

The display module 1130 is configured to display a ballistic trajectory of the attack item according to the flight distance of the attack item.

In an optional embodiment, the flight distance of the attack item includes a horizontal displacement and a vertical displacement; and the processing module 1120 is further configured to calculate the flight distance of the attack item according to the initial speed, the gravitational acceleration, and the flight time of the attack item through the following formula:

$$s_1 = V_0 t$$
$$s_2 = \frac{1}{2} G t^2$$

where $s_1$ is the horizontal displacement, $s_2$ is the vertical displacement, $V_0$ is the initial speed, t is the flight time of the attack item, and G is the gravitational acceleration.

In an optional embodiment, the apparatus is applied to a terminal, and the apparatus further includes a transmission module and a receiving module, where the transmission module 1140 is configured to transmit a damage value to a server;

the receiving module 1150 is configured to receive a damage instruction transmitted by the server, the damage instruction being an instruction transmitted after the server determines that the damage value is valid; and the processing module 1120 is further configured to deduct the hit point value of the target object according to the damage instruction and the damage value.

In an optional embodiment, the apparatus is applied to a server, and the apparatus further includes a receiving module 1150 and a transmission module 1140, where the receiving module 1150 is configured to receive the parameters of the at least two media transmitted by the terminal after determining that the attack item hits the target object; and the transmission module 1140 is configured to transmit a damage instruction to the terminal, the damage instruction being used for instructing the terminal to deduct the hit point value of the target object according to the damage value.

In an optional embodiment, the processing module 1120 is further configured to deduct an endurance value of the target object according to the damage value in a case that the target object is a non-living thing.

An exemplary embodiment of this application provides an apparatus for displaying a damage value of an attack item in a virtual environment, the apparatus may be applied to the first terminal 120 or the second terminal 160 in the embodiment of FIG. 1, and the apparatus includes a display module, a receiving module, and a shooting module, where the display module is configured to display a first interface, a firing control being displayed on the first interface;

the receiving module is configured to receive a firing trigger signal for the firing control; and the shooting module is configured to control, according to the firing trigger signal, a virtual object to shoot an attack item at a target object, the display module being further configured to display a second interface in a case that the attack item hits the target object after passing through at least two media, a damage value of the attack item to the target object being displayed on the second interface, and damage values corresponding to cases that the attack item passes through at least one combination of different types of media and different quantities of media being different.

In an optional embodiment, the display module is further configured to display a ballistic trajectory of the attack item on the second interface.

Figure 12:
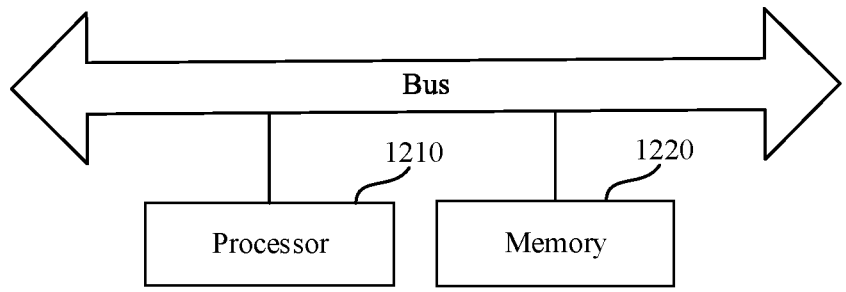
FIG. 12 is a structural block diagram of a computer device according to an exemplary embodiment of this application.

FIG. 12 shows a structural block diagram of a computer device according to an exemplary embodiment of this application. The computer device is configured to implement a method for obtaining a damage value of an attack item in a virtual environment on a server side provided in the foregoing embodiments, and the computer device may be the first terminal 120 or the second terminal 160 in the embodiment of FIG. 1. The device includes a processor 1210 and a memory 1220.

The processor 1210 may be a central processing unit (CPU), a network processor (NP), or a combination of the CPU and the NP. The processor 1210 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 1220 is connected to the processor 1210 by using a bus or in other manners. The memory 1220 stores at least one computer-readable instruction, at least one program, a code set or an instruction set. The at least one computer-readable instruction, the at least one program, the code set or the instruction set is loaded and executed by the processor 1210 to implement the method for obtaining a damage value of an attack item in a virtual environment shown in the embodiment of FIG. 2, FIG. 5, or FIG. 6. The memory 1220 may be a volatile memory, a non-volatile memory, or a combination thereof. The volatile memory may be a random access memory (RAM), for example, a static random access memory (SRAM) or a dynamic random access memory (DRAM). The non-volatile memory may be a read-only memory (ROM), for example, a programmable ROM (PROM), an erasable programmable ROM (EPROM), or an electrically erasable programmable ROM (EEPROM). The non-volatile memory may alternatively be a flash memory or a magnetic memory, for example, a magnetic tape, a floppy disk, or a hard disk. The non-volatile memory may alternatively be an optical disc.

In an embodiment, a computer device is provided. The computer device includes a processor and a memory. The memory stores a computer-readable instruction. The computer-readable instruction, when executed by the processor, causes the processor to perform steps of the method for obtaining a damage value of an attack item in a virtual environment in any one of the foregoing embodiments. In addition, the computer-readable instruction, when executed by the processor, causes the processor to perform steps of the method for displaying a damage value of an attack item in a virtual environment in any one of the foregoing embodiments.

Figure 13:
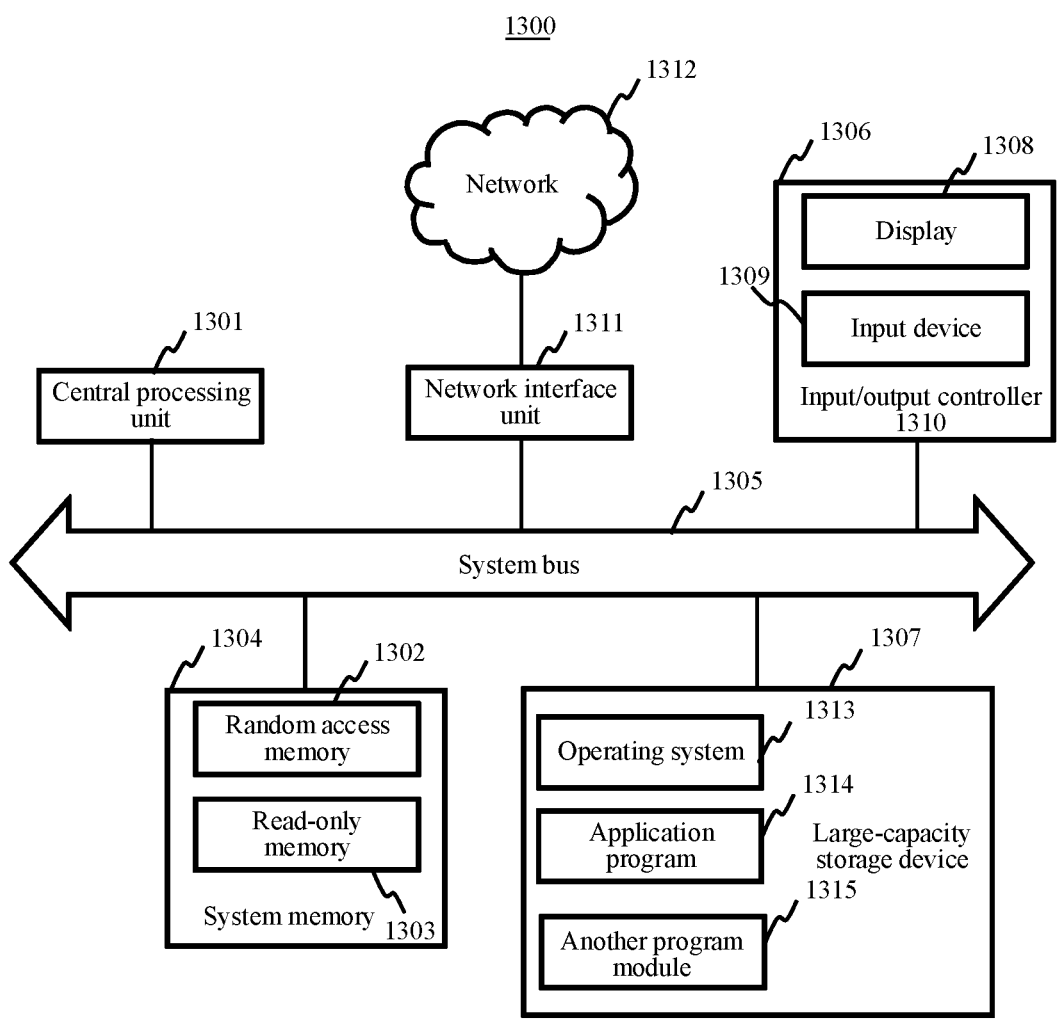
FIG. 13 is a structural block diagram of a computer device according to an exemplary embodiment of this application.

FIG. 13 shows a schematic structural diagram of a computer device according to an embodiment of this application. The computer device is configured to implement a method for obtaining a damage value of an attack item in a virtual environment on a server side provided in the foregoing embodiments, and the computer device may be the server 140 in the embodiment of FIG. 1. Specifically:

The computer device 1300 includes a central processing unit (CPU) 1301, a system memory 1304 including a random access memory (RAM) 1302 and a read-only memory (ROM) 1303, and a system bus 1305 connecting the system memory 1304 and the CPU 1301. The computer device 1300 further includes a basic input/output system (I/O system)

1306 configured to transmit information between components in the computer, and a large-capacity storage device 1307 configured to store an operating system 1313, an application program 1314, and another program module 1315. As a description instead of a limitation, the ROM may include a programmable ROM (PROM), an electrically programmable ROM (EPROM), or an electrically erasable programmable ROM (EEPROM). The RAM may include a static RAM (SRAM), a dynamic RAM (DRAM), a synchronous DRAM (SDRAM), a double data rate SDRAM (DDR SDRAM), an enhanced SDRAM (ESDRAM), a synchronization link (Synchlink) DRAM (SLDRAM), a Rambus (Rambus) direct RAM (RDRAM), a direct Rambus dynamic RAM (DRDRAM), and a Rambus dynamic RAM (RDRAM).

The basic I/O system 1306 includes a display 1308 configured to display information and an input device 1309 such as a mouse or a keyboard that is configured for information inputting by a user. The display 1308 and the input device 1309 are both connected to the CPU 1301 by using an input/output controller 1310 connected to the system bus 1305. The basic I/O system 1306 may further include the input/output controller 1310, for receiving and processing an input from a plurality of other devices such as a keyboard, a mouse, or an electronic stylus. Similarly, the input/output controller 1310 further provides output to a display screen, a printer, or another type of output device.

The large-capacity storage device 1307 is connected to the CPU 1301 by using a large-capacity storage controller (not shown) connected to the system bus 1305. The large-capacity storage device 1307 and an associated computer-readable medium provide non-volatile storage for the computer device 1300. That is, the large-capacity storage device 1307 may include a computer-readable medium (not shown), such as a hard disk or a CD-ROM drive.

Without loss of generality, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, it may be known by a person skilled in the art that the computer storage medium is not limited to the foregoing several types. The system memory 1304 and the large-capacity storage device 1307 may be collectively referred to as a memory.

According to the embodiments of this application, the computer device 1300 may be further connected, through a network such as the Internet, to a remote computer on the network and run. That is, the computer device 1300 may be connected to a network 1312 by using a network interface unit 1311 connected to the system bus 1305, or may be connected to another type of network or a remote computer system (not shown) by using a network interface unit 1311.

The memory further includes one or more programs. The one or more programs are stored in the memory and configured to be executed by one or more processors. The one or more programs include instructions used for performing the method for obtaining a damage value of an attack item in a virtual environment according to the foregoing embodiments. In addition, the one or more programs include instructions used for performing the method for displaying a damage value of an attack item in a virtual environment according to the foregoing embodiments.

This application further provides a computer-readable storage medium, storing at least one computer-readable instruction, at least one program, a code set or an instruction set, the at least one computer-readable instruction, the at least one program, the code set or the instruction set being loaded and executed by a processor to perform the method for obtaining a damage value of an attack item in a virtual environment according to the foregoing method embodiments; and in addition, to further perform the foregoing method for displaying a damage value of an attack item in a virtual environment.

Optionally, this application further provides a computer program product including a computer-readable instruction. When run on a computer, the computer program product causes the computer to perform the method for obtaining a damage value of an attack item in a virtual environment according to the foregoing aspects; and in addition, further causes the computer to perform the method for displaying a damage value of an attack item in a virtual environment according to the foregoing aspects.

It is to be understood that "a plurality of" described in this specification refers to two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The sequence numbers of the foregoing embodiments of this application are merely for the convenience of description, and do not imply the preference among the embodiments.

A person of ordinary skill in the art may understand that all or some of the steps of the embodiments may be implemented by hardware or a program instructing relevant hardware. The program may be stored in a computer-readable storage medium. The storage medium mentioned above may be a read-only memory, a magnetic disk, or an optical disc.

The foregoing descriptions are merely preferred embodiments of this application, and are not intended to limit this application. Any modification, equivalent replacement, improvement and the like made within the spirit and principle of this application shall fall within the protection scope of this application.

What is claimed is:

1. A method for obtaining a damage value of an attack item in a virtual environment, performed by a computer device having a processor and memory storing a plurality of computer programs to be executed by the processor, the method comprising:

detecting a fire of an attack item by a virtual object in the virtual environment;

in response to the fire of the attack item, obtaining attenuation parameters of at least two media through which the attack item passes in a flight process;

calculating a ballistic trajectory of the attack item based, at least in part, on the attenuation parameters;

determining whether the attack item hits a target object in the virtual environment along the ballistic trajectory;

in accordance with a determination that the attack item hits the target object, calculating a damage value of the attack item to the target object according to the attenuation parameters of the at least two media after the attack item passes through the at least two media; and
deducting a hit point value of the target object according to the damage value.

2. The method according to claim 1, wherein the calculating a damage value of the attack item to the target object according to the attenuation parameters of the at least two media after the attack item passes through the at least two media comprises:
obtaining an initial speed of the attack item;
calculating a final speed of the attack item according to the initial speed and the attenuation parameters of the at least two media after the attack item passes through the at least two media; and
calculating the damage value according to the initial speed and the final speed.

3. The method according to claim 2, wherein the calculating a final speed of the attack item according to the initial speed and the attenuation parameters of the at least two media after the attack item passes through the at least two media comprises:
calculating an ith speed of the attack item after passing through an ith medium according to an (i−1)th speed and ith attenuation parameters of the ith medium, wherein i is a natural number, and the (i−1)th speed is a speed of the attack item after passing through an (i−1)th medium, wherein
the (i−1)th speed is the initial speed in a case that i is equal to 1, and the ith speed is the final speed in a case that i is a maximum value.

4. The method according to claim 3, wherein the calculating an $i^{th}$ speed of the attack item after passing through an $i^{th}$ medium according to an $(i-1)^{th}$ speed and $i^{th}$ attenuation parameters of the $i^{th}$ medium comprises:
calculating, according to the $(i-1)^{th}$ speed, the $i^{th}$ attenuation parameters, and a quantity of frames for which the attack item needs to fly in a case that the attack item passes through the $i^{th}$ medium, the $i^{th}$ speed through the following formula:

$$V_i = V_{i-1} - (k_i - 1)\square(a_i V_0^2 + b_i V_0)$$

wherein Vi is the $i^{th}$ speed, Vi−1 is the $(i-1)^{th}$ speed, V0 is the initial speed, ai and bi are the ith attenuation parameters, and ki is the quantity of frames for which the attack item needs to fly in a case that the attack item passes through the ith medium.

5. The method according to claim 2, wherein the calculating the damage value according to the initial speed and the final speed comprises:
obtaining damage parameters of a ranged weapon corresponding to the attack item; and
calculating the damage value according to the damage parameters of the ranged weapon, the initial speed, and the final speed.

6. The method according to claim 5, wherein the calculating the damage value according to the damage parameters of the ranged weapon, the initial speed, and the final speed comprises:
calculating the damage value according to the damage parameters of the ranged weapon, the initial speed, and the final speed through the following formula:

$$Y = e\square\left(\frac{V_n}{V_0}\right)^2 + f\square\left(\frac{V_n}{V_0}\right),$$

wherein Y is the damage value, Vn is the final speed, V0 is the initial speed, and e and f are the damage parameters of the ranged weapon.

7. The method according to claim 1, wherein the calculating a ballistic trajectory of the attack item based, at least in part, on the attenuation parameters further comprises:
calculating a flight distance of the attack item according to an initial speed, a gravitational acceleration, and a flight time of the attack item, the gravitational acceleration being a parameter preset in an application program on which the virtual environment is run; and
generating a display of the ballistic trajectory of the attack item according to the flight distance of the attack item.

8. The method according to claim 7, wherein the flight distance of the attack item comprises a horizontal displacement and a vertical displacement, and the calculating a flight distance of the attack item according to the initial speed, a gravitational acceleration, and a flight time of the attack item comprises:
calculating the flight distance of the attack item according to the initial speed, the gravitational acceleration, and the flight time of the attack item through the following formula:

$$s_1 = V_0 t$$
$$s_2 = \frac{1}{2} G t^2$$

wherein s1 is the horizontal displacement, s2 is the vertical displacement, V0 is the initial speed, t is the flight time of the attack item, and G is the gravitational acceleration.

9. The method according to claim 1, wherein the deducting a hit point value of the target object according to the damage value further comprises:
transmitting the damage value to a server;
receiving a damage instruction transmitted by the server, the damage instruction being an instruction transmitted after the server determines that the damage value is valid; and
deducting the hit point value of the target object according to the damage instruction and the damage value.

10. The method according to claim 1, wherein the obtaining attenuation parameters of at least two media through which the attack item passes in a flight process comprises:
receiving the parameters of the at least two media transmitted by a terminal; and
the deducting a hit point value of the target object according to the damage value comprises:
transmitting a damage instruction to the terminal, the damage instruction being used for instructing the terminal to deduct the hit point value of the target object according to the damage value.

11. The method according to claim 1, further comprising:
deducting an endurance value of the target object according to the damage value in a case that the target object is a non-living thing.

12. A computer device, comprising a processor and memory, the memory storing a plurality of computer-executable instructions, and the computer-executable instructions, when loaded and executed by the processor, causing the computer device to perform a plurality of operations including:
detecting a fire of an attack item by a virtual object in the virtual environment;

in response to the fire of the attack item, obtaining attenuation parameters of at least two media through which the attack item passes in a flight process;

calculating a ballistic trajectory of the attack item based, at least in part, on the attenuation parameters;

determining whether the attack item hits a target object in the virtual environment along the ballistic trajectory;

in accordance with a determination that the attack item hits the target object, calculating a damage value of the attack item to the target object according to the attenuation parameters of the at least two media after the attack item passes through the at least two media; and deducting a hit point value of the target object according to the damage value.

13. The computer device according to claim 12, wherein the calculating a damage value of the attack item to the target object according to the attenuation parameters of the at least two media after the attack item passes through the at least two media comprises:

obtaining an initial speed of the attack item;

calculating a final speed of the attack item according to the initial speed and the attenuation parameters of the at least two media after the attack item passes through the at least two media; and calculating the damage value according to the initial speed and the final speed.

14. The computer device according to claim 13, wherein the calculating a final speed of the attack item according to the initial speed and the attenuation parameters of the at least two media after the attack item passes through the at least two media comprises:

calculating an ith speed of the attack item after passing through an ith medium according to an (i−1)th speed and ith attenuation parameters of the ith medium, wherein i is a natural number, and i≥1; and the (i−1)th speed is a speed of the attack item after passing through an (i−1)th medium, wherein the (i−1)th speed is the initial speed in a case that i is equal to 1, and the ith speed is the final speed in a case that i is a maximum value.

15. The computer device according to claim 13, wherein the calculating the damage value according to the initial speed and the final speed comprises:

obtaining damage parameters of a ranged weapon corresponding to the attack item; and calculating the damage value according to the damage parameters of the ranged weapon, the initial speed, and the final speed.

16. The computer device according to claim 12, wherein the calculating a ballistic trajectory of the attack item based, at least in part, on the attenuation parameters further comprises:

calculating a flight distance of the attack item according to an initial speed, a gravitational acceleration, and a flight time of the attack item, the gravitational acceleration being a parameter preset in an application program on which the virtual environment is run; and generating a display of the ballistic trajectory of the attack item according to the flight distance of the attack item.

17. The computer device according to claim 12, wherein the deducting a hit point value of the target object according to the damage value further comprises:

transmitting the damage value to a server;

receiving a damage instruction transmitted by the server, the damage instruction being an instruction transmitted after the server determines that the damage value is valid; and deducting the hit point value of the target object according to the damage instruction and the damage value.

18. The computer device according to claim 12, wherein the obtaining attenuation parameters of at least two media through which the attack item passes in a flight process before hitting the target object comprises:

receiving the parameters of the at least two media transmitted by a terminal; and the deducting a hit point value of the target object according to the damage value comprises:

transmitting a damage instruction to the terminal, the damage instruction being used for instructing the terminal to deduct the hit point value of the target object according to the damage value.

19. The computer device according to claim 12, further comprising:

deducting an endurance value of the target object according to the damage value in a case that the target object is a non-living thing.

20. A non-transitory computer-readable storage medium, storing a plurality of computer-executable instructions, and the computer-executable instructions, when loaded and executed by a processor of a computer device, causing the computer device to perform a plurality of operations including:

detecting a fire of an attack item by a virtual object in the virtual environment;

in response to the fire of the attack item, obtaining attenuation parameters of at least two media through which the attack item passes in a flight process;

calculating a ballistic trajectory of the attack item based, at least in part, on the attenuation parameters;

determining whether the attack item hits a target object in the virtual environment along the ballistic trajectory;

in accordance with a determination that the attack item hits the target object, calculating a damage value of the attack item to the target object according to the attenuation parameters of the at least two media after the attack item passes through the at least two media; and deducting a hit point value of the target object according to the damage value.

* * * * *